United States Patent [19]

Scholl

[11] 4,205,451
[45] Jun. 3, 1980

[54] DISPLACEMENT TRANSDUCER

[75] Inventor: Rolland D. Scholl, Dunlap, Ill.

[73] Assignee: Caterpillar Tractor Co., Peoria, Ill.

[21] Appl. No.: 30,391

[22] PCT Filed: Feb. 12, 1979

[86] PCT No.: PCT/US79/00076
§ 371 Date: Feb. 12, 1979
§ 102(e) Date: Feb. 12, 1979

[51] Int. Cl.² .............................................. G01B 7/02
[52] U.S. Cl. ..................................................... 33/172 E
[58] Field of Search .................. 73/DIG. 1, 778, 784, 73/141 A; 33/1 H, 148 H, 172 E, 147 N, 143, 174 L, 125 R; 84/456, 457; 331/154, 156; 324/80; 177/210 R, 210 EM, 210 FP

[56] References Cited
U.S. PATENT DOCUMENTS

| | | |
|---|---|---|
| 2,929,196 | 3/1960 | Hetzel . |
| 2,949,727 | 8/1960 | Hetzel . |
| 2,960,817 | 11/1960 | Hetzel . |
| 3,919,910 | 11/1975 | Rust ................................. 84/456 X |
| 3,977,242 | 8/1976 | Brown ............................. 73/DIG. 1 |

FOREIGN PATENT DOCUMENTS

| | | | |
|---|---|---|---|
| 363857 | 2/1973 | U.S.S.R. ................................ 33/172 E |
| 502217 | 4/1976 | U.S.S.R. ................................ 73/DIG. 1 |
| 485304 | 12/1975 | U.S.S.R. ................................ 33/172 E |

Primary Examiner—Harry N. Haroian
Attorney, Agent, or Firm—John L. James

[57] ABSTRACT

A displacement transducer (1) has a housing (12) with an opening (14) and an input rod (22) which extends from the housing (12) through the opening (14). A roller assembly (32) is positioned within the housing (12) and is associated with the input rod (22). A vibrating reed (42) is fastened to the housing (12) and the roller assembly (32) is in contact with the reed (42). As the input rod (22) is displaced, the roller assembly (32) moves and changes the vibrating length of the reed (42) and the natural vibratory frequency of the reed (42). Thus, a change in rod (22) displacement causes a change in the vibratory frequency of the reed (42).

8 Claims, 3 Drawing Figures

DISPLACEMENT TRANSDUCER

TECHNICAL FIELD

This invention relates to displacement transducers and more particularly to mechanical input displacement transducers.

BACKGROUND ART

Displacement transducers are used to measure small displacements typically on the order of a fraction of a millimeter. Naturally, with measurements of this magnitude error must be minimized. One source of error is human error which comes about when standard dials and guages are read to determine displacement. It is desirable to have a digital guage which would minimize the possibility of human error.

One type of transducer is known as a vibrating string transducer which utilizes the physics law of vibrating strings:

$$f = 1/2L\sqrt{q/s}$$

where
- f = frequency of vibration of the wire
- L = length of wire suspended between two points
- q = tensile stress in the wire
- s = density of the wire Thus, by measuring the frequency of vibration of the wire, its length can be determined. Any change of the length causes a corresponding change of the natural oscillation frequency of the wire. The mechanical oscillation of the wire is converted into an electric signal by means of an inductive pickup system located near the oscillating wire as taught by Kurt S. Lion at pages 8385 in his book *Instrumentation in Scientific Reasearch; Electrical Input Transducers*, published in 1959 by McGraw-Hill Book Company, Inc. Lion mentions that the steel wire or string, in vibrating, varies the magnetic flux in the air gap of the pickup system. The output signal is amplified and fed back into an electromagnet to keep the string excited at its natural frequency.

U.S. Pat. Nos. 2,929,196, 2,949,727 and 2,960,817 granted to Max Hetzel on Mar. 22, 1960, Aug. 23, 1960, Nov. 22, 1960, respectively, disclose a watch mechanism. U.S. Pat. No. 2,960,817 is exemplary of these patents and discloses a two-tined tuning fork, one tine of which operates a ratchet wheel which indexes the timepiece. A circuit similar to the Lion circuit above is used to excite the tines which then vibrate at a natural frequency determined by their length. However, the length of the tuning fork is fixed so that it oscillates at a predetermined frequency thus making this fixed movement unsuitable for measuring displacement. It is therefore desirable to have a displacement transducer which utilizes an accurate vibrating device and produces a digital output which can be interfaced with other digital equipment.

DISCLOSURE OF INVENTION

A displacement transducer comprises a housing having an opening and an input rod having first and second rollers and is connected to the second end of the input rod. A reed has a first end portion fastened to the housing and a second end portion which is free to vibrate at a natural frequency variable with the length of the second end portion. At least one of the rollers is in contact with the reed and movable between the first and second end portions of the reed. The length of the second end portion of the reed changes as the at least one roller moves between the first and second end portions.

BEST MODE FOR CARRYING OUT THE INVENTION

Figure 1:
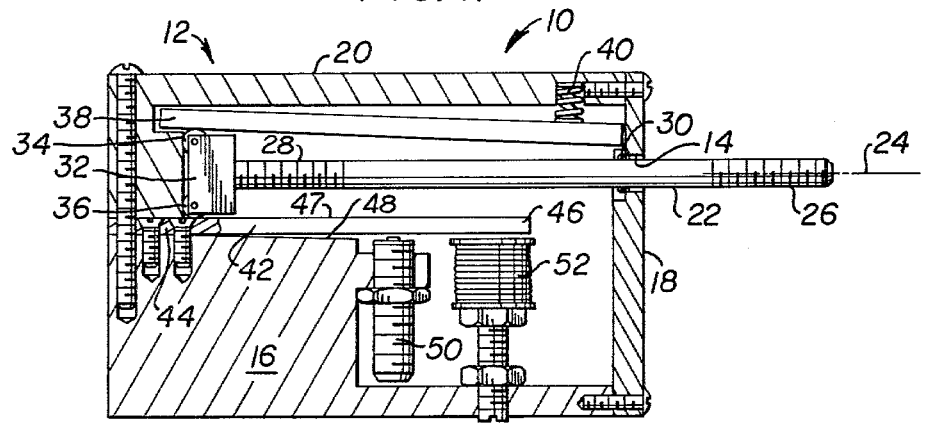
FIG. 1 is a diagrammatic sectional view of an embodiment of a displacement transducer.

Referring to FIG. 1, a displacement transducer 10 has a housing 12 with an opening 14 therein. The housing 12 preferably includes a base member 16, a sidewall member 18 having the opening 14, and a top member 20. The sidewall 18 and top 20 are connected to the base member 16 by screws or the like.

An input rod 22 has a longitudinal axis 24, a first, free end portion 26 extending through the housing opening 14, and a second, supporting end portion 28 positioned within the housing 12. Means, such as a seal 30, prevent movement of the input rod 22 relative to the housing opening 14 except in a direction substantially parallel to the axis 24. The input rod 22 is displaced axially when an axial force is subjected upon the free end 26.

A roller assembly 32 has a first upper roller 34 and a second lower roller 36 and is connected to the fixed end 28 of the input rod 22. The upper roller 34 is at a higher elevation than the input rod 22 while the lower roller 36 is at a lower elevation. The free end 26 of the rod 22 is movable toward and from the sidewall 18 of the housing 12 during movement of the rod 22 on the rollers 34,36.

A first roller guide 38 is attached to the housing 12 and contacts the upper roller 34 which rides on and rolls along the roller guide 38. The roller guide 38 has one end embedded in the top portion 20 of the housing 12 and has the other end free for movement. A biasing means, such as spring 40 which is positioned between the top 20 and roller guide 38, urges the roller guide 38 toward the base member 16. As the roller 34 rolls along the roller guide 38 the spring 40 insures firm, even contact between the roller 34 and roller guide 38.

A reed 42 is positioned in the housing 12 in contact with the lower roller 36 thereby functioning as a lower roller guide. The reed has a fixed first end portion 44 preferably fastened to the housing 12 by screws or the like and a second end portion 46 which is free to vibrate at a natural frequency which varies with the length of the free end portion 46. The reed 42 also has a surface 47 which serves as a second roller guide for the second roller 36.

The base member 16 has a slightly arched portion 48 underlying the reed 42 so that the slightly arched portion 16 drops away from the reed 42 leaving a space therebetween. As the lower roller 36 moves along the reed 42, the overlying reed 42 is pressed against the underlying incline 48 thereby changing the length of the free end portion 46 of the reed 42.

A sensing coil 50 and a driving coil 52 are positioned beneath the free end 46 of the reed 42 and are connected to the base member 16.

Figure 3:
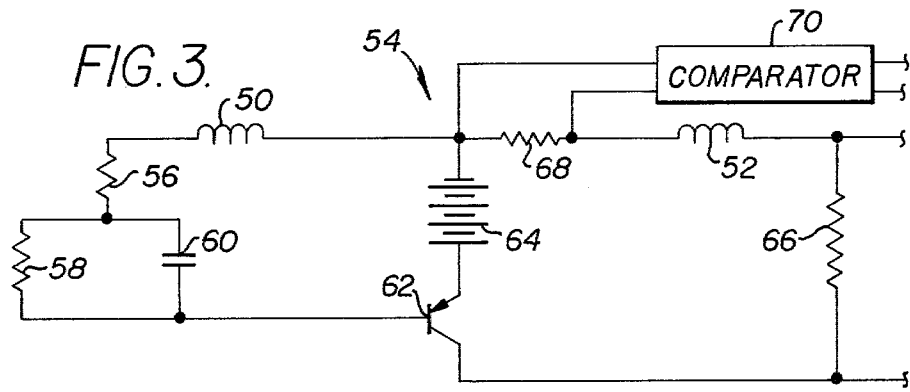
FIG. 3 is schematic diagram of a circuit useable with the embodiment of FIG. 1 or FIG. 2.

Referring to FIG. 3, the sensing and driving coils 50,52 are connected in a circuit 54 in which the sensing coil 50 has one terminal connected to battery negative. The other terminal of the sensing coil 50 is connected to one end of a resistor 56. The other end of the resistor 56 is connected to a resistor 58 and a capacitor 60 which are both connected to the base of a transistor 62. The emitter of transistor 62 is connected to the positive terminal of the battery 64. The collector of the transistor 62 is connected to resistor 66 which is connected in series with driving coil 52 which is coupled to battery negative. As described, the circuit 54 functions to controllably oscillate the free end 46 of the reed 42 at the natural frequency of the free end 46 of the reed 42.

Means, such as resistor 68 and comparator 70, are connected to the circuit 54 for extracting a frequency output which is a digital representation of the axial displacement of the free end 26 of the input rod 22. The resistor 68 is connected in series with the driving coil 52 and the comparator 70 is connected across the resistor 68.

Figure 2:
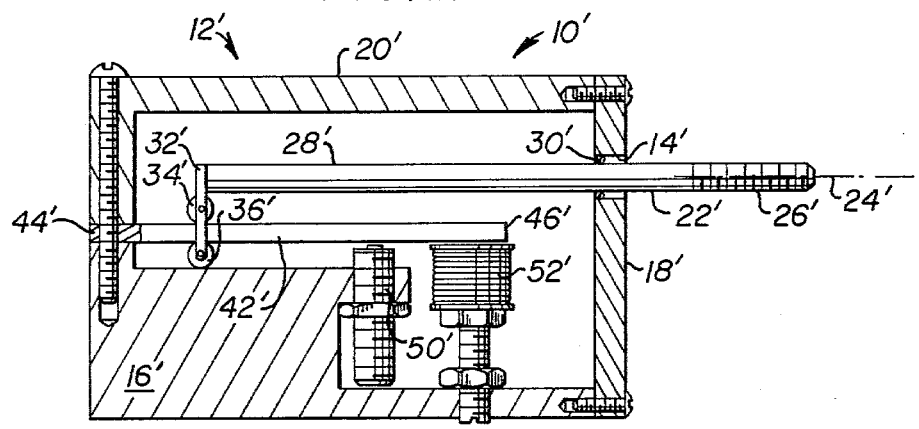
FIG. 2 is a view similar to FIG. 1 but illustrating another embodiment of a displacement transducer.

Referring to FIG. 2, another embodiment of the displacement transducer is shown in which like members are indicated with "'" numerals. The reed 42' is fastened between the base member 16' and top portion 20' of the housing 12'. The free end portion 46' of the reed 42' does not contact the underlying portion of the base 16' and is spaced therefrom. The reed 42' extends between the upper and lower rollers 34', 36' and is in contact with both rollers. The input rod 22' is attached to the roller assembly 32' at a higher elevation than the upper roller 34'.

INDUSTRIAL APPLICABILITY

Referring to FIG. 1, as the free end 26 of the input rod 22 is displaced toward the fully displaced position illustrated, the rollers 34,36 move along their respective roller guides 38,42. The spring 40 urges the upper roller guide 38 against the upper roller 34 when the roller 34 is shifted to the right in FIG. 1. This insures firm contact which is necessary because the incline of the base 16 would otherwise cause the input rod 22 to tilt. As the lower roller 36 moves along the reed 42, the reed 42 is pressed against the base member 16 which causes the point of contact of the base 16 and reed 42 to coincide with the position of the lower roller. Thus, the length of the free end 46 of the reed 42 is determined by the position of the lower roller 36 which is, in turn, dependent upon the amount of displacement.

Referring to FIG. 2, as the input rod 22' is displaced, the rollers 34',36' move along the reed 42'. The point of contact of the wheels 34',36' with the reed 42' determines the length of the free end 46' and hence the vibrating frequency.

Referring to FIG. 3, when the input rod 22 is displaced, the length of the free end 46 of the reed 42 changes. As the reed 42 responds to this change by vibrating, the sensing coil 50 responds by varying the voltage of the capacitor 60. When the capacitor voltage reaches the proper level, the transistor 62 conducts and energizes the driving coil 52 which sustains the vibration of the reed 42. Since the voltage across coil 50 changes at the rate of vibration, the transistor 62 switches on and off at the rate of vibration and the voltage fluctuation across coil 52 is at the rate of vibration. Each time the transistor 62 conducts a voltage appears across the resistor 68 which is sensed by the comparator 70. The comparator 70 produces an output for each period of conduction of the transistor 62. Thus, a counter can be connected to the comparator 70 and the count of the counter will be the frequency of vibration of the reed 42.

Other aspects, objects and advantages of this invention can be obtained from a study of the drawings, the disclosure and the appended claims.

I claim:

1. A displacement transducer (10), comprising:
a housing (12) having an opening (14);
an input rod (22) having a longitudinal axis (24), a first end portion (26) extending through the housing opening (14), and a second end portion (28) positioned within the housing (10);
a roller assembly (32) having first and second rollers (34,36) and being connected to the second end (28) of the input rod (22);
a reed (42) having a first end portion (44) fastened to the housing (10) and second end portion (46), said second end portion (46) being free to vibrate at a natural frequency variable with the length of the second end portion (46), at least one (36) of said rollers (34,36) being in contact with the reed (42) and movable between the first and second end portions (44,46), of the reed (42), said roller (36) changing the length of the second end portion (46) as the roller (36) moves between the first and second end portions (44,46);
means (54) for controllably oscillating the second end (46) of the reed (42) at the natural frequency of the second end (46) of the reed (42); and
means (68,70), connected to the oscillating means (54), for extracting a frequency output which is a representation of the displacement of the first end portion (26) of the input rod (22).

2. A displacement transducer (10), as set forth in claim 1, wherein the reed (42) extends between the first and second rollers (34,36) with the second roller (36) being below the reed (42) and the first roller (34) being above the reed (42).

3. A displacement transducer (10), as set forth in claim 1, including means (30) for preventing movement of the input rod (22) relative to the housing opening (14) except in a direction parallel to the longitudinal axis (24) of the input rod (22).

4. A displacement transducer (10), as set forth in claim 1, wherein the input rod (22) is positioned between the first and second rollers (34,36) with the first roller (34) being above the rod (22) and the second roller (36) being below the rod (36), and wherein the housing (12) includes a roller guide (38), said first roller (34) being in contact with the roller guide (38), said second roller (36) being in contact with the reed (42).

5. A displacement transducer (10), as set forth in claim 4, including means (40) for biasing the roller guide (38) toward the reed (42).

6. A displacement transducer (10), comprising:
a housing (12) having an opening (14);
an input rod (22) having a free end portion (26) extending through the housing opening (14) and a supporting end portion (28) positioned within the housing (12);
a roller assembly (38) having a first roller (34) positioned on one side of the rod (22), a second roller (36) positioned on the other side of the rod (22), and being connected to the rod (22), said free end portion (26) of the rod (22) being movable toward and from the housing (12) during movement of the rod (22) on the first and second rollers (34,36);

a first roller guide (38) attached to the housing (10) and contacting the first roller (34), said first roller (34) being rollably movable along the first roller guide (38);

a reed (42) having a first end portion (44) fastened to the housing (12), a second end portion (46) and a surface (49), said second roller (36) being rollably movable along the reed surface (47);

means (54), associated with the reed (42), for controllably oscillating the reed (42) at the natural frequency of the reed (42); and means (68,70), connected to the oscillating means (54), for extracting a digital frequency output which is a digital representation of the displacement of the free end portion (26) of the input rod (22).

7. A displacement transducer (10), as set forth in claim 6, including means (30) for preventing movement of the input rod (22) relative to the housing opening (14) except in a direction parallel to a longitudinal axis (24) of the input rod (22).

8. A displacement transducer (10), as set forth in claim 6, wherein the oscillating means (54) includes a coil (52) and wherein the extracting means (68,70) includes a resistor (68) connected in series with the coil (52) and a comparator (70) connected in parallel with the resistor (68).

* * * * *